May 30, 1933.  R. RODERWALD  1,911,532

PROCESS OF MANUFACTURING ENDLESS V-BELTS

Filed Dec. 6, 1930

INVENTOR
Rudolf Roderwald.
BY
ATTORNEYS.

Patented May 30, 1933

1,911,532

UNITED STATES PATENT OFFICE

RUDOLF RODERWALD, OF BERLIN, GERMANY, ASSIGNOR TO THE DAYTON RODERWALD COMPANY, OF DAYTON, OHIO, A CORPORATION OF OHIO

PROCESS OF MANUFACTURING ENDLESS V-BELTS

Application filed December 6, 1930, Serial No. 500,549, and in Germany November 7, 1930.

My invention relates to a process of manufacturing an endless full V-belt with projections produced by removing parts of the belt at separated points.

In the United States Letters Patent No. 1,701,507 I have proposed a process of manufacturing V-belts which consists in forming the belt throughout its length as a solid full V-belt and then removing parts of the belt at separated points to provide projections or teeth.

According to my present invention I propose to use certain constructions of endless solid full V-belts and to provide these belts with the said projections in the same manner.

By removing parts of the belt the flexibility of the belt becomes considerably increased. Therefore, when this process of removing parts is employed on a belt, which is built up by parallel layers of a rubberized fabric or cloth and which possesses a priori a high degree of flexibility, an exorbitant flexibility is obtained. Similarly, when this process of removing parts is employed on a belt which is built up by a rubberized fabric rolled on its longitudinal axis and which possesses a priori a smaller degree of flexibility, likewise a considerably higher degree of the flexibility is obtained.

Therefore, it is an object of my present invention to produce V-belts and especially endless V-belts of considerable flexibility and it is a further object of my invention to produce endless belts adapted to run over pulleys with very small diameters, and finally it is an object of my present invention to produce the said belts at very small cost.

Figure 1:
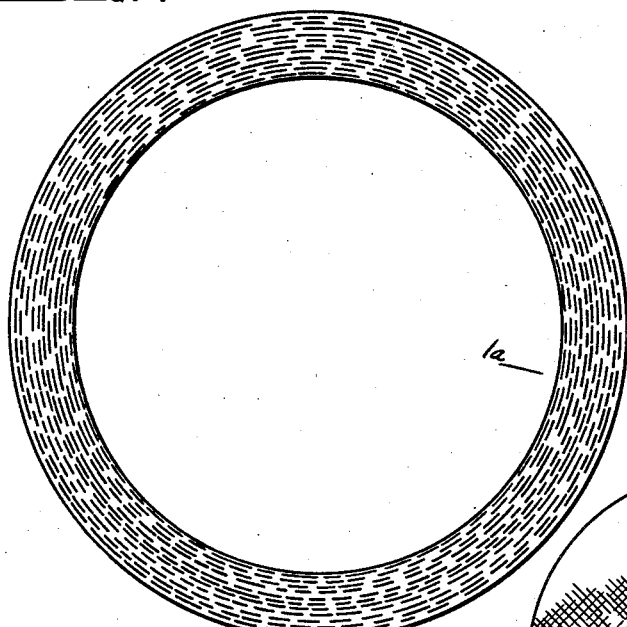
Figure 1 is a side view of a solid full V-belt built up by parallel layers of a rubberized fabric.

In both embodiments illustrated in the drawing a solid and full V-belt is first produced.

Figure 1A:
Figure 1a shows a cross section on the line 1a—1a of Figure 1.
Figure 2:
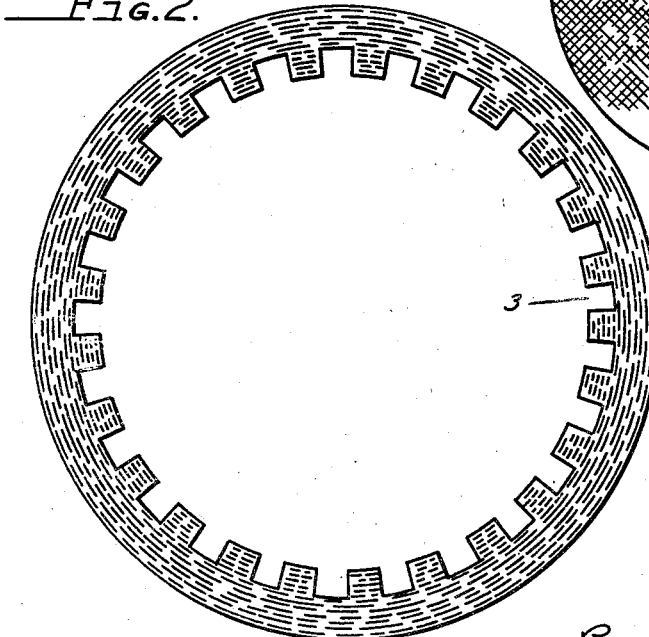
Figure 2 is a side view of this belt, when provided with projections separated by recesses made by removing parts.
Figure 3:
Figure 3 shows a cross section on the line 3—3 of Figure 2.

In the embodiment shown in Figures 1, 1a, 2 and 3 the full belt is built up by a plurality of parallel layers, as clearly shown from the section of Figures 1a and 3.

As illustrated in Figure 2 this belt is now provided with projections by removing parts of the belt at separated points on the smaller or inner side of the endless belt, whereby an endless belt of considerable flexibility is obtained. This belt is adapted to run over the smallest diameters, which occur in practice. The endless belt illustrated in Figure 1 is preferably built up by an endless band wound on a drum with an outer diameter like the inner diameter of the endless belt.

If desired, a layer of pure rubber may be inserted in the middle part of the belt. By removing the parts e. g. by stamping, the cut is laid through the said pure layer of rubber, so that the inner side of the recesses remains covered and protected by the remaining part of the layer. Moreover, the said layer is adapted to resiliently hold the projections on the belt.

Figure 4:
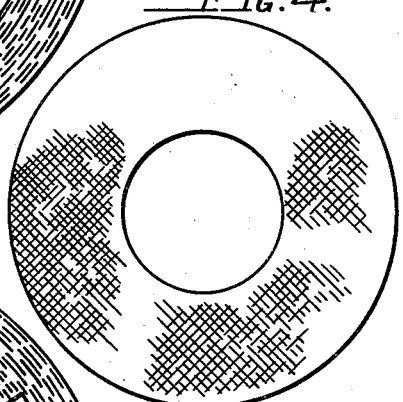
Figure 4 illustrates a further embodiment of my invention and shows in a reduced scale an annular-formed piece of rubberized fabric adapted to form an endless belt by rolling the fabric and pressing it afterwards to trapezoidal form.

According to the other embodiment of my invention illustrated on Figure 4 the annular-shaped fabric shown in the drawing is rolled and pressed to trapezoidal form and then provided with teeth or projections in the same manner as fully described above.

It will be understood that I desire to comprehend within my invention such modifications as may be necessary to adapt it to varying conditions and uses.

Having thus fully described my invention, what I claim as new and desire to secure by Letters Patent, is:

1. The process of manufacturing an endless full V-belt with projections thereon, characterized in that a full V-belt is built up of a plurality of parallel layers, a layer of pure rubber being inserted between the parallel layers preferably in the middle height of the belt, parts being afterward removed on the inner side of the endless belt whereby teeth are formed and the flexibility of the belt is considerably increased.

2. The process of manufacturing an endless belt consisting of forming a belt with inner and outer layers of rubberized fabric and an intermediate layer of pure rubber, and forming of the inner layers teeth by cutting parts of the inner layers away.

3. The process of manufacturing an endless belt consisting of the following steps: forming a plurality of endless parallel layers upon each other by winding an impregnated fabric, inserting a layer of rubber at substantially the middle of said belt during the winding operation, subjecting portions of the sides of said belt, as formed by the winding operation to greater pressure than other portions of the sides to form an endless belt of trapezoidal cross section and then removing parts of the higher compressed portions of the belt and at least a portion of said rubber layer to form projections.

In testimony whereof, I affix my signature.

RUDOLF RODERWALD.